(12) United States Patent
Martin

(10) Patent No.: US 6,288,163 B1
(45) Date of Patent: Sep. 11, 2001

(54) ANTI-GRAFFITI PAINT COMPOSITION

(76) Inventor: Louis-Marie Joseph Martin, 1 Taylor Lane, Ottawa, Ontario (CA), K1M 2A9

( * ) Notice: Subject to any disclaimer, the term of this patent is extended or adjusted under 35 U.S.C. 154(b) by 0 days.

(21) Appl. No.: 09/284,420

(22) PCT Filed: Nov. 3, 1997

(86) PCT No.: PCT/CA97/00817

§ 371 Date: Apr. 5, 1999

§ 102(e) Date: Apr. 5, 1999

(87) PCT Pub. No.: WO98/21282

PCT Pub. Date: May 22, 1998

(30) Foreign Application Priority Data

Nov. 8, 1996 (CA) .................................................... 2189898
Oct. 30, 1997 (CA) .................................................... 2214336

(51) Int. Cl.$^7$ ...................................................... C08J 00/00
(52) U.S. Cl. ........................ 524/588; 524/409; 524/502; 524/544; 525/100; 525/101; 525/474; 427/387; 428/446; 428/447; 106/2
(58) Field of Search ................................... 525/101, 100, 525/474; 524/544, 502, 588, 401; 106/2; 427/387; 428/446, 447

(56) References Cited

U.S. PATENT DOCUMENTS

| 4,280,947 | * | 7/1981 | Mori . | |
| 5,039,745 | * | 8/1991 | Riddle | 525/101 |
| 5,811,483 | * | 9/1998 | Close | 524/500 |

FOREIGN PATENT DOCUMENTS

| 2469437 | * | 5/1981 | (FR) . |
| 2537985 | * | 6/1984 | (FR) . |
| 2630353 | * | 10/1989 | (FR) . |
| 2684682 | * | 6/1993 | (FR) . |

OTHER PUBLICATIONS

English abstract of JP 08041386 A Sato et al., Feb. 1996.*
English abstract of JP 05078617 A Masioka Mar. 1993.*

* cited by examiner

Primary Examiner—Robert Dawson
Assistant Examiner—Jeffrey B. Robertson

(57) ABSTRACT

A paint composition includes from about 1 to about 41% by volume of a silicone caulking, from about 1 to about 41% by volume of mineral spirits and from about 18 to about 98% by volume of a paint. The paint composition provides good repellency against graffiti and is not sacrificial in nature.

8 Claims, No Drawings

ANTI-GRAFFITI PAINT COMPOSITION

FIELD OF THE INVENTION

The present invention relates to a paint composition and is particularly concerned with an paint composition which is repellent against graffiti.

BACKGROUND OF THE INVENTION

Graffiti damage has been an increasingly growing concern. The term graffiti has lost it's historical meaning and has acquired a negative tone to it. Today most people view graffiti not as an art form but as a form of vandalism and property destruction. Graffiti is mostly found in institutions such as schools, public and private buildings, automobiles, trucks, trains, cars and public rest rooms and, in open areas such as support walls for bridges, inner walls of buildings and park structures. The vast majority of graffiti are created with oil-based paints including enamels, epoxies, lacquers and urethanes, which are applied by spray cans.

Conventionally, removal of unwanted graffiti has been performed by sandblasting the graffiti from the substrate. However, this method is expensive and hazardous to health due to the emission of potential carcinogenic particles. Moreover, the method causes damages to the paint surface. No long term solutions are offered by the use of this method and the surface will likely be repainted with new graffiti damages.

Another method commonly used is by treating the substrate with chemicals. In this case, the chemicals often destroy the surface and, are generally hazardous as they require handling with highly caustic solutions.

In an attempt to overcome many of the problems associated with sandblasting and chemical methods, it has been common practice to apply a protective coating on top of the paint or to use a paint which has anti-adhesive properties against graffiti. However, such coatings or paints have a slow final curing time. Also, they are too soft and is often damages by the paint removers which are used to remove the graffiti. Another disadvantage is that such coatings and paints do not age well, and with time will often become sticky and pick up dirt.

SUMMARY OF THE INVENTION

An object of the present invention is to provide a paint composition which is repellent against graffiti and which is not sacrificial.

In accordance with one aspect of the present invention, there is provided a paint composition comprising:
(a) from about 1 to about 41% by volume of a silicone selected from the group consisting of silicone rubber and silicone oil; and
(b) the balance comprising a paint.

Preferably, the amount of silicone in the paint composition is from about 1 to about 35% by volume, and most preferably from about 10 to about 25% by volume. The silicone rubber may be silicone caulking (non-paintable), and the paint may be a clear or colored paint, or a mixture thereof. The paint may be water-based, solvent-based or oil-based, preferably, the paint is water-based.

The paint composition may further include from about 1 to about 41%, and preferably, from about 1 to about 35% and, most preferably from about 10 to about 25% by volume of mineral spirits. Generally, the ratio of silicone to mineral spirits is about 1:1.

The paint composition may further include from about 5 to about 15% by volume of additives. Suitable additives are polytetrafluoroethylene, UV sunscreens, color pigments and liquid cement.

In accordance with another embodiment of the present invention, there is provided a paint composition comprising:
(a) from about 1 to about 41% by volume of a silicone selected from the group consisting of silicone rubber and silicone oil;
(b) from about 1 to about 41% by volume of mineral spirits;
(c) from about 5 to about 15% by volume of additives; and
(d) the balance comprising a paint.

In accordance with another aspect of the present invention, there is provided a paint composition comprising:
(a) about 20% by volume of silicone caulking;
(b) about 20% by volume of mineral spirits; and
(c) the balance comprising an industrial clear paint.

In accordance with another aspect of the present invention, there is provided a topcoat comprising:
(a) about 10% by volume of silicone caulking;
(b) about 10% by volume of mineral spirits;
(c) about 5% by volume of a liquid cement;
(d) about 25% by volume of an industrial clear paint; and
(e) about 50% by volume of a colored paint.

In accordance with another aspect of the present invention, there is provided a cement paste comprising:
(a) from about 1 to about 41% by volume of a silicone selected from the group consisting of silicone rubber and silicone oil; and
(b) the balance comprising a liquid cement.

Preferably, the liquid cement is in an amount of 60% by volume of the total volume of the cement paste. The cement paste may further include from about 1 to about 41% of mineral spirits and from about 5 to about 15% of additives.

In accordance with another aspect of the present invention, there is provided a method for removing graffiti from a substrate comprising:
(a) applying at least one layer of a primer-sealer onto the substrate;
(b) applying at least one layer of a topcoat comprising:
(i) from about 1 to about 41% by volume of a silicone selected from the group consisting of silicone rubber and silicone oil; and
(ii) the balance comprising a mixture of a clear paint and a colored paint; and
(c) applying at least one layer of a clear coat comprising:
(i) from about 1 to about 41% by volume of a silicone selected from the group consisting of silicone rubber and silicone oil; and
(ii) the balance comprising a clear paint.

The silicone rubber may be silicone caulking. Preferably, the amount of silicone caulking is about 10% by volume in the topcoat and about 20% by volume in the clear coat. The topcoat and clear coat may further include from about 1 to about 41% by volume of mineral spirits and, from about 5 to 15% of additives such as liquid cement and UV protectors.

The advantages of the paint composition of the present invention are that it has a quick final curing time, is not sacrificial and is safe to use in contrast to epoxy coatings.

DETAILED DESCRIPTION OF THE INVENTION

The terms "paint" as used herein refers to any fluid material that will spread over a solid surface and dry or harden to an adherent film; "vandalized substrate" refers to a substrate on which there are graffiti; "cleaned substrate"

refers to a substrate where graffiti has been removed by, for example, repainting the substrate with the paint composition of the present invention; and "new graffiti" refers to graffiti that is applied onto cleaned surface. It will be further understood that the terms "substrate" and "surface" are sued generally interchangeably.

In accordance with one aspect of the present invention, there is provided a paint composition including:

(a) from about 1 to about 41% by volume of a silicone selected from the group consisting of silicone rubber and silicone oil; and (b) the balance comprising a paint.

Preferably, the paint composition includes from about 1 to about 35% by volume of silicone, and most preferably from about 10 to about 25% by volume of silicone.

An example of a source of silicone rubber that is used in the paint composition of the present invention is the silicone caulking from the product Silicone II (not paintable) manufactured by GE™ Silicones, Waterford, N.Y. The silicone caulking makes the paint composition repellent against graffiti.

The paint may be solvent-based, oil-based or water-based and can be clear or can include color pigments. An example of clear paint is the product Insl-Thane II Industrial Waterborne Acrylic Enamel manufactured by Insl-X Products Corporation, StoneyPoint, N.Y., USA. This product is preferred mainly because its rapid final curing time of seven days in contrast to the usual thirty days. Another advantage of the Insl-Thane product is that it is an industrial paint and hence, is tougher, from example it can withstand extreme weather conditions, and is harder, i.e. can withstand repeated cleanings, upon drying than most commercially available products. Therefore, the above clear paint provides a good vehicle for the silicone.

A suitable colored paint, i.e. a paint which has color pigments, is a commercially available house paint such as Ultra High Gloss Architectural Waterborne Acrylic Enamel manufactured by Glidden™.

In addition to the components (a) and (b), mineral spirits may be added to the paint composition in order to melt the silicone rubber. Varsol™ made by MasterCraft™ has been found to be an efficient product for this purpose. The varsol™ may be purchased at Canadian Tire, ON. Canada. The preferred ratio of silicone rubber to mineral spirits is about 1:1.

Additives may also be incorporated in the paint composition of the present invention. Examples of additives are paint repellents such as polytetrafluoroethylene, liquid cement, color pigments and UV sunscreens. A suitable source of polytetrafluoroethylene is Teflon™ manufactured by Dupont™. A suitable source of liquid cement is the product Liquid Concrete Crack Filler manufactured by U.S.E. Hickson Products Ltd., Scarborough, ON., Canada. The liquid cement helps make the paint tougher and harder.

One example of a source of UV sunscreen can be found in already prepared paint formulations such as the product Rain-Shield Clear MB by Germite™ Product Inc. Mississauga, Ontario, Canada.

The paint composition of the present invention may be used on a variety of type of surfaces such as masonry, wood or steel surfaces in order to remove graffiti therefrom. Masonry surfaces may include cements, concrete bricks, mortars, plasters and stuccoes.

Depending on the condition of the surface, pre-washing the surface may be required. The pre-washing may be accomplished using conventional techniques. The substrate should at least by washed with soap and water to remove any dirt which may affect bonding prior to applying the paint composition. After surface preparation, an undercoat such as a primer-sealer is applied to the surface to seal, prime and block out stains. Although not required, a primer-sealer undercoat is highly recommended to minimize poor and uneven gloss, to prevent the surface from getting dirty quickly and enhance the adhesion of the topcoat to the surface. In this case, the primer-sealer used is the product Aquacrylic Gripper™ from ICI Paints (Canada) Inc., Concord, Ontario Canada. Generally, two layers of undercoat is sufficient; however more layers may be applied.

Following the application of the undercoat, a topcoat is applied onto the undercoat. The topcoat is provided by the paint composition of the present invention. It will be appreciated by a person skilled in the art that the actual composition of the paint composition will depend mostly on the location of the substrate and taste of the individual. For example, in areas of heavy traffic, one may choose to add more silicone rubber in order to make the formula more repellent, and perhaps, to add liquid cement in order to provide a hard coating upon drying. One possible combination of ingredients to provide a paint composition which can be used as a topcoat may include:

(a) from about 1 to about 41% by volume of silicone caulking;

(b) from about 1 to about 41% by volume of mineral spirits;

(c) from about 5 to about 15% by volume of liquid cement; and (d) the balance comprising a mixture of an industrial clear paint and a colored paint.

Preferably, the topcoat includes:

(a) about 10% by volume of silicone caulking;

(b) about 10% by volume mineral spirits;

(c) about 5% by volume of a liquid cement; and (d) the balance comprising a mixture of an industrial clear paint and a colored paint.

Preferably, the mixture has a ratio of clear paint to colored paint of about 1:2. Depending on the surface, one or several layers of topcoat may be applied. Preferably, at least two layers of topcoat are applied. The topcoat is repellent against most type of markings such as coating of paints, varnishes, urethane shellacs and lacquers; however, it was noted that it is not highly repellent against magic markers. It is postulated that the magic marker binds to the pigments of the colored paint rending its removal difficult. Therefore, it is advisable to include a clear coat, which was found to provide good repellency against all types of graffiti, including magic markers. It appears that the magic marker cannot impregnate into the clear coat.

The clear coat may include:

(a) from about 1 to about 41% by volume of silicone caulking;

(b) from about 1 to about 41% by volume of mineral spirits; and (c) the balance including an industrial clear paint.

Preferably, the clear coat includes:

(a) about 20% by volume of silicone caulking;

(b) about 20% by volume of mineral spirits; and (c) the balance including an industrial clear paint.

Again, liquid cement may be added to the clear coat to render the paint harder upon drying. It should be noted that by adding liquid cement into the clear coat, the clear coat will have a tint of cement color. Hence, such clear coats are preferably used on cement substrates. One to several layers of clear coats may be applied onto the topcoat. Generally, in areas of high traffic, two to four layers of clear coat should be applied in order to provide adequate protection. The clear coat also protects the topcoat from dirt and extreme atmospheric conditions, hence prolonging the lifetime of the topcoat. In addition, it was noted that the aesthetic appearance of the surface is enhanced by including the clear coat.

In another embodiment of the present invention, there is provided a cement paste which is anti-adhesive against graffiti. The cement paste includes:

(a) from about 1 to about 41% by volume of a silicone selected from the group consisting of silicone rubber and silicone oil; and (b) the balance comprising a liquid cement.

The thickness of the paste can be varied by adjusting the about of liquid cement therein, or by adding a clear paint. The cement paste may further include from about 1 to about 41% by volume of mineral spirits. Similarly to the paint composition, the cement paste can be used to cover unwanted graffiti.

EXAMPLE 1

Clear Coat

A clear paint composition was formulated by mixing 2.8 L (0.6 gallon) Silicone II, 2.8 L (0.6 gallon) of Varsol™ and 12.8 L (2.8 gallons) of Insl-Thane II Acrylic Enamel Borne Enamel. The ingredients were mixed at room temperature to provide a homogeneous mixture which was used as a clear coat.

EXAMPLE 2

Topcoat

A paint composition was formulated by mixing 4.6 L (1 gallon) of clear paint composition obtained from example 1 with 4.6 L (1 gallon ) of Ultra High Gloss Architectural Waterborne Acrylic Enamel obtained by Glidden™ in a 23 L (5 gallons) barrel. The paint solution was mixed at room temperature to provide a homogeneous mixture which was used as a topcoat.

EXAMPLE 3

Cement Paste

The cement paste was formulated by mixing 0.92 L of silicone II, 0.92 L of mineral spirits and 2.76 L of Liquid concrete Crack Filler in a 23 L barrel. The paste mixture was mixed at room temperature to obtain a thick homogeneous cement paste which can be used to fill in deep crevices in the substrate.

The paint composition according to the invention was tested outdoors on a pre-cast cement wall which is exposed under various atmospheric conditions such as direct sunlight, shades and rain at various temperatures, or a bridge underpass.

Several samples were prepared in order to determine whether the composition had anti-adhesive properties against graffiti. Referring to Tables 1 and 2, two types of surfaces were used, namely cement surface exposed to air and a surface of a bridge underpass. The samples were prepared by various methods as shown in the tables. After the samples were prepared, graffiti was applied thereon and removed with a mild bio-degradable paint remover. It has been found that 1-methyl-2-pyrrolidinone obtained from A & C American Chemicals Ltd. is an effective paint remover.

The results were rated as either poor, adequate or good. A poor result means that graffiti could not be successfully removed from the surface. An adequate result signifies that graffiti could be removed from the surface; however the surface may be damaged. A good result means that graffiti can easily be removed from the surface without damaging the surface, even after repeated cleanings.

TABLE 1

Results from the anti-adhesive test carried on a cement surface.

| Time (months) | Sample 1 1 primer-sealer | Sample 2 pre-washed 2 topcoats | Sample 3 pre-washed 1 clear coat | Sample 4 pre-washed 1 primer-sealer 2 topcoats 2 clear coats | Sample 5 pre-washed 1 primer-sealer 2 topcoats | Sample 6 pre-washed 1 cement paste |
|---|---|---|---|---|---|---|
| 1 | adequate | poor | poor | good | adequate | good |
| 2 | adequate | poor | poor | good | adequate | good |
| 3 | adequate | poor | poor | good | adequate | good |

TABLE 2

Results from the anti-adhesive test carried out on a surface located under a bridge.

| Time (months) | Sample 7 1 primer-sealer | Sample 8 pre-washed 2 topcoats | Sample 9 pre-washed 1 clear coat | Sample 10 pre-washed 1 primer-sealer 2 topcoats 2 clear coats | Sample 11 pre-washed 1 primer-sealer 2 topcoats | Sample 12 pre-washed 1 cement paste |
|---|---|---|---|---|---|---|
| 1 | adequate | poor | poor | good | adequate | good |
| 2 | adequate | poor | poor | good | adequate | good |
| 3 | adequate | poor | poor | good | adequate | good |

Samples 1 and 7 were prepared by applying one layer of undercoat having a thickness of about 4 MILS 100 Microns/Dry 2 MILS 50 Microns, with a roller. The undercoat was allowed to dry for 30 minutes. It was found that after 30 minutes the applied primer-sealer coat was dry to the touch.

The preparation of samples 2 and 8 included cleaning the surfaces with a broom and applying a 4.0 MILS 100 Microns/Dry 1.5 MILS 37.5 Microns thick topcoat. The topcoat was allowed to dry for one hour, following which a second topcoat was applied. The second topcoat was allowed to dry for six hours prior to the application of graffiti.

The preparation of samples 3 and 9 included cleaning the surfaces with a broom and a clear coat was applied and allowed to dry for one hour.

The preparation of samples 4 and 10 included pre-washing the surfaces with a broom and applying a 4 MILS 100 Microns/Dry 2 MILS 50 Microns thick of undercoat primer-sealer. The undercoat was allowed to dry for thirty minutes and a 4 MILS 100 Microns/Dry 2 MILS 50 Microns thick topcoat was applied. A second topcoat was applied and allowed to dry for six hours. A clear coat was applied and allowed to dry for one hour. A second clear coat was applied and allowed to dry. Graffiti was applied.

The preparation of samples 5 and 11 included pre-cleaning the surfaces with a broom. The surfaces were coated with a 4 MILS 100 Microns/Dry 2 MILS 50 Microns thick of primer-sealer. The primer-sealer was left to dry for thirty minutes. A topcoat of about the same thickness as that of the undercoat was applied and allowed to dry. A second topcoat was applied and allowed to dry. Graffiti was applied.

The preparation of samples 6 and 12 included pre-washing the surfaces and applying a layer of cement paste. Graffiti was applied.

All of the above sample testing were carried out as accurately as possible. A new roller and separate clean gallon container was used for each and every new sample site, taking great care as not to contaminate them. A broom was used to remove accumulated dirt and dust on the samples after 10, 20, 30, 60, 90 days respectively.

Samples 1 and 7 gave adequate results. This may be due to the fact that there was only one thick coat of primer-sealer and hence, may not have had enough paint thickness to withstand repeated cleanings of graffiti. It may also be that the outer skin of the undercoat is too soft to withstand repeated cleanings.

Samples 2 and 8 gave poor results, even worse that of samples 1 and 7. It seems that the topcoat gave good protection against graffiti; however, the topcoat did not adhere well to the substrate, and would be damaged by repeated cleanings. In a similar manner, samples 3 and 9 also gave poor results.

Samples 5 and 11 gave adequate results. Although the topcoat had good repellency against most types of graffiti, it was only adequate against magic markers.

The results demonstrate that the paint composition of the present invention is repellent against graffiti by preventing graffiti, including posters, from adhering to it. The preferred method for protecting a vandalized substrate is by applying at least one layer of primer-sealer, two layers of topcoat and two layers of clear coat. Alternatively, a cement paste may be used to protect the substrate.

What is claimed is:

1. An anti-graffiti composition comprising:
   (a) from 10 to 35% by volume of silicone rubber in the form of a silicone caulking;
   (b) from 10 to 35% by volume of mineral spirits, the ratio of silicone rubber to mineral spirits being 1:1; and
   (c) the balance being made up from a paint and a liquid cement.

2. The anti-graffiti composition of claim 1, wherein the amount of silicone is from about 10 to about 25% by volume.

3. The anti-graffiti composition of claim 1, wherein the paint is a clear paint, colored paint or a mixture thereof.

4. The anti-graffiti composition of claim 1, wherein the paint is water-based, oil-based or solvent based.

5. The anti-graffiti composition of claim 1 including from 5 to 15% by volume of additives.

6. The anti-graffiti composition of claim 5, wherein the additives are selected from the group consisting of polytetrafluoroethylene, UV sunscreens, liquid cement and color pigments.

7. An anti-graffiti paint composition comprising:
   (a) 20% by volume of silicone caulking;
   (b) 20% by volume of mineral spirits; and
   (c) the balance being an industrial clear paint and a liquid cement.

8. An anti-graffiti top coat paint composition comprising:
   (a) 10% by volume of silicone caulking
   (b) 10% by volume of mineral spirits;
   (c) 5% by volume of a liquid cement;
   (d) 25% by volume of an industrial clear paint; and
   (e) 50% by volume of a colored paint.

* * * * *